US008340909B2

(12) United States Patent
Humphrey

(10) Patent No.: US 8,340,909 B2
(45) Date of Patent: *Dec. 25, 2012

(54) SYSTEM FOR MONITORING PROPANE OR OTHER CONSUMABLE LIQUID IN REMOTELY LOCATED STORAGE TANKS

(76) Inventor: Richard L. Humphrey, Goodlettsville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/086,641

(22) Filed: Apr. 14, 2011

(65) Prior Publication Data

US 2011/0247705 A1 Oct. 13, 2011

Related U.S. Application Data

(63) Continuation of application No. 12/777,055, filed on May 10, 2010, now Pat. No. 7,937,216, which is a continuation-in-part of application No. 12/363,502, filed on Jan. 30, 2009, now Pat. No. 7,937,215, which is a continuation of application No. 11/874,784, filed on Oct. 18, 2007, now Pat. No. 7,512,488, which is a continuation of application No. 11/097,964, filed on Apr. 1, 2005, now Pat. No. 7,295,919, application No. 13/086,641, which is a continuation of application No. 11/396,048, filed on Mar. 31, 2006, now abandoned.

(60) Provisional application No. 60/558,852, filed on Apr. 3, 2004, provisional application No. 60/683,465, filed on May 20, 2005, provisional application No. 60/668,211, filed on Apr. 2, 2005.

(51) Int. Cl.
*G01C 21/00* (2006.01)

(52) U.S. Cl. ........ 701/533; 701/104; 701/123; 73/53.01

(58) Field of Classification Search ................... 701/104, 701/123, 204, 214, 220, 533; 73/53.01; 705/7, 705/26; 702/45

See application file for complete search history.

(56) References Cited

U.S. PATENT DOCUMENTS

| 5,023,806 A | 6/1991 | Patel |
| 5,133,005 A | 7/1992 | Kelley et al. |
| 5,161,184 A | 11/1992 | Smith et al. |
| 5,708,424 A | 1/1998 | Orlando et al. |
| 5,790,653 A | 8/1998 | Fairbanks, Sr. et al. |
| 5,913,180 A | 6/1999 | Ryan |

(Continued)

OTHER PUBLICATIONS

Engineering, Testing and Certification Centre, Certificate of Conformity, Jul. 23, 2002, Australia (4 pp.).

(Continued)

*Primary Examiner* — Gertrude Arthur-Jeanglaude

(74) *Attorney, Agent, or Firm* — David D. Griner; Abel Law Group, LLP

(57) ABSTRACT

An improved apparatus and method for monitoring the levels of propane or other consumable liquid in remotely located storage tanks and coordinating delivery of liquid to those tanks, including an improved method of using the remote monitoring data to identify out-of-ordinary conditions at remote tanks, optimally schedule purchases or deliveries, improve safety, and more efficiently operate a propane dealership. More accurate and timely information concerning the status of customer tanks serves to improve operational efficiencies and increase safety. Data received from remote sensors can be collected and organized so that it is easily understood and utilized through the implementation of a user interface accessible via the Internet that allows the information to be presented in an efficient graphical and contextual fashion. Operational efficiencies can also be improved by calculating site-specific Degree-days and K-factors for each tank and by taking historical propane usage for each tank, weather conditions, and projected fuel usage into account.

20 Claims, 11 Drawing Sheets

U.S. PATENT DOCUMENTS

| | | | |
|---|---|---|---|
| 5,943,420 A | 8/1999 | Bonhomme et al. |
| 6,023,806 A | 2/2000 | Dumlao et al. |
| 6,064,311 A | 5/2000 | Ferenczi et al. |
| 6,137,276 A | 10/2000 | Rudolph |
| 6,336,362 B1 | 1/2002 | Duenas |
| 6,369,715 B2 | 4/2002 | Bennett, Jr. et al. |
| 6,668,665 B2 | 12/2003 | Schimnowski et al. |
| 7,127,361 B1 | 10/2006 | Batey et al. |
| 7,197,407 B2 | 3/2007 | Schimnowski et al. |
| 7,295,919 B2 | 11/2007 | Humphrey |
| 7,304,588 B2 | 12/2007 | Ingalsbe et al. |
| 7,512,488 B2 | 3/2009 | Humphrey |
| 2004/0153370 A1 | 8/2004 | Yang |
| 2006/0243347 A1 | 11/2006 | Humphrey |

OTHER PUBLICATIONS

International Electrotechnical Commission, IECEx Assessment and Test Report, Jul. 5, 2002, Australia (2 pp.).
Silicon Controls, Invoice, Aug. 12, 2003 (1 p.).
Underwriters Laboratories, Inc., Procedure and/or Report Material, Sep. 24, 2003 (2 pp.).
Silicon Controls, Gaslog Overview, 2002 (6 pp.).
Gaslog Installation and Maintenance Guide, 2002 (36 pp.).

Sky Tracker Propane Delivery Management

Linden's Propane, Inc.

Schedule Results . . .

Delivery

| Stop | Unit S/N | Address | Customer | Capacity | Deliver |
|---|---|---|---|---|---|
| 1 | GGF-123-698-BBNK | 78 Peter Piper Rd | Smith | 100 gals | 64 gals |
| 2 | TTTP-877-GHFC-43 | 675 Prairie Vista | Johnson | 600 gals | 378 gals |
| 3 | 55478-552236 | 15839 Chestnut Ln | Williams | 750 gals | 412 gals |
| 4 | RED-7786-MNJ-16 | 12 E.Althea Rd | Jones | 900 gals | 459 gals |
| 5 | JJ-0000-A18-4Q | 12 E. 7th St. | Brown | 400 gals | 200 gals |
| 6 | NMLS-9321-SLW-998 | 998 Oak Lane | Davis | 500 gals | 365 gals |

Route

| Stop | Arrive | Address | Distance |
|---|---|---|---|
| 2 | 08:35:36 AM | 12 E. 7th St. | 6.02 miles |
| 3 | 09:25:27 | 998 Oak Lane | 17.92 miles |
| 4 | 10:18:48 | 12 E.Althea Rd | 18.03 miles |
| 5 | 11:59:30 | 675 Prairie Vista | 40.76 miles |
| 6 | 01:22:34 | 78 Peter Piper Rd | 32.57 miles |
| 7 | 02:18:22 | 15839 Chestnut Ln | 20.1 miles |
| H | | Home | 16.78 miles |

FIG. 6

Sky Tracker Propane Delivery Management

Linden's Propane, Inc.

Schedule Delivery...

Select Available Trucks

|   | Unit S/N | Capacity | Location | Last Delivery | Last delivery Time |
|---|---|---|---|---|---|
| ✔ | 180-5G-252 | 3000 gal | At Customer | Thompson | Thursday 1-22-2004 |
|   | 180-5A-709 | 2500 gal | On Route |   |   |
|   | 180-5R-024 | 6000 gal | On Route |   |   |
| ✔ | 300-5G-252 | 3500 gal | In Yard |   |   |
|   | Rick's Big Tanker | 9000 gal | At Customer |   |   |

Select Delivery Customers

|   | Unit S/N | Customer | Capacity | Fill | Status | Report |
|---|---|---|---|---|---|---|
| ✔ | NMLS-9321-SLW-998 | Davis | 500 gals | 35 gals | 7% |   |
| ✔ | GGF-123-698-BBNK | Smith | 100 gals | 16 gals | 16% |   |
| ✔ | TTTP-877-GHFC-43 | Johnson | 600 gals | 102 gals | 17% |   |
| ✔ | 55478-552236 | Williams | 750 gals | 187.5 gals | 25% |   |
| ✔ | RED-7786-MNJ-16 | Jones | 900 gals | 261 gals | 29% |   |
|   | JJ-0000-A18-4Q | Brown | 400 gals | 120 gals | 30% |   |

*FIG. 7*

SYSTEM FOR MONITORING PROPANE OR OTHER CONSUMABLE LIQUID IN REMOTELY LOCATED STORAGE TANKS

This application is a continuation of U.S. Non Provisional application Ser. No. 12/777,055, filed May 10, 2010, which is a continuation-in-part of U.S. Non Provisional application No. 12,363,502, filed Jan. 30, 2009, which is a continuation of U.S. Non Provisional application Ser. No. 11/874,784, filed Oct. 18, 2007, now U.S. Pat. No. 7,512,488, which is a continuation of U.S. Non Provisional application Ser. No. 11/097,964, filed Apr. 1, 2005, now U.S. Pat. No. 7,295,919, which claims priority from U.S. Provisional Application No. 60/558,852, filed Apr. 3, 2004; and is a continuation of U.S. Non Provisional application Ser. No. 11/396,048, filed Mar. 31, 2006, which claims priority from U.S. Provisional Application No. 60/683,465, filed May 20, 2005, and from U.S. Provisional Application No. 60/668,211, filed Apr. 2, 2005; all of which are hereby incorporated by reference.

TECHNICAL FIELD OF THE INVENTION

The present invention relates to an improved system for delivering propane or other consumable liquid to and monitoring liquid levels in remotely located storage tanks.

BACKGROUND AND SUMMARY OF THE INVENTION

Propane is a gas, a derivative of natural gas and petroleum. It is one of the many fossil fuels that are included in the liquefied petroleum (LP) gas family. Because propane is the type of LP-gas most commonly used in the United States, propane and LP-gas are often used synonymously.

Under normal atmospheric pressure and temperature, propane is a gas. Under moderate pressure and/or lower temperatures, however, propane changes into a liquid. Because Propane takes up much less space in its liquid form, it is easily stored as a liquid in pressurized tanks. When propane vapor (gas) is drawn from a tank, some of the liquid in the tank instantly vaporizes to replace the vapor that was removed.

Homes and businesses use about one-third of the propane consumed in the U.S. Propane is used mostly in homes in rural areas that do not have natural gas service. More than 20 million households use propane to meet some of their energy needs, while 16 million households use propane as their main heating source. Homes that use propane as a main energy source usually have a large propane tank outside of the house that stores propane under pressure as a liquid.

Because home space heating is a primary use of propane, demand is much higher during the winter months. Residential users of propane typically have a 250-500 gallon tank installed by a local propane dealer and accessible to delivery trucks for refilling. Depending on the climate, a typical residential tank is filled three to four times per year. A residential tank is usually owned by the propane dealer and rented to the residential customer for an annual fee.

Propane dealers typically operate out of bulk storage plants that include one to two 30,000 gallon storage tanks. A single dealer will usually be able to effectively service a 35 mile radius around the plant, though in less populated regions a much larger service area may be necessary to achieve sufficient volume. Propane is delivered to customers by bulk delivery trucks or "bobtails" which typically hold from 1,800 to 3,000 gallons of propane. Customer tanks usually make up the largest portion of a dealer's assets.

Obviously, different size tanks and different usage rates for customers over a large area can make it very challenging for a dealer to keep all of his customers' tanks filled. The quantity of liquid propane stored and remaining on customer propane tanks needs to be measured frequently so that the propane dealer can manage his own inventory of bulk propane, efficiently schedule deliveries, and most importantly keep his customers supplied with propane. There are also significant safety concerns associated with propane tank levels since empty or overfilled tanks can be very dangerous. Further, costs associated with delivery, including wages for delivery personnel and vehicle operation and fuel costs, are a significant portion of a dealer's operating expenses. For this reason, dealers must try to maximize the ratio of gallons of delivered propane per mile traveled by delivery vehicles in order to lower delivery costs.

Traditionally, the standard practice was for propane dealers to periodically visit each tank and visually read a gauge located on the tank in order to determine whether the tank needed refilling. If the tank level was low, it would be refilled; if not, the delivery truck had essentially wasted a trip. As could be expected, this highly inefficient practice contributed to higher costs, both for the dealer and the customers.

For this reason, a number of forecasting methods were developed to give dealers a better idea of how much propane a customer was using and when more should be delivered. Since propane is primarily used as a heating fuel, the typical forecasting method involved factoring temperature and historic customer usage rates. A Degree Day is a unit used to measure how cold it has been over a 24-hour period. The base temperature for Degree-day calculations is 65 degrees. The actual temperature is compared to the 65° base temperature and if the temperature is lower, the difference is the number of Degree-days for that day. For example, if the average temperature for a 24-hour period was 60°, that would be 5° less than the base temperature of 65°, so we would have 5 Degree-days for that 24-hour period. Another concept, referred to as the K-factor, is used to get an idea of the propane usage rate for a customer. The customer's K-factor is the number of Degree-days that it takes for a given customer (or burner(s) associated with a given tank) to use one gallon of propane.

From these two measurements, a dealer could get a better idea as to when more propane should be delivered. For example, a customer with a 275-gallon propane tank with a historic K-factor of 5 could be expected to go 1375 Degree-days before the tank is empty. However, since an empty tank is a dangerous condition (plus it means the customer is out of fuel) delivery will need to be made before the 1375 Degree-days have elapsed. Further, these types of forecasting methods cannot account for unexpected periods of higher or lower than normal propane usage. Since this kind of forecasting is merely an estimate, a substantial margin of error must be built into the delivery schedule. This results in more deliveries of lower amounts of propane and consequently higher dealer delivery costs.

For many years, various optimal vehicle routing computer programs have been available to minimize the mileage and travel time associated with making desired deliveries using vehicles with known capacities. All such methods in the prior art, however, necessarily depend upon various methods of forecasting a customer's propane usage since the last delivery and, as discussed above, such forecasting methods are never completely reliable.

More recently, remote monitoring systems have been used to allow remote transmission of data relating to the level of the liquid gas contained in customer tanks. This allows for the delivery of fuel or other fluids to the storage tank on an "as-needed" basis. Such monitoring systems are typically more accurate than forecasting systems and increase the efficiencies of the propane supplier.

Storage tank monitoring systems currently in use typically include a float sensor within a storage tank that measures the level of fluid and the temperature within the storage tank. For remote monitoring systems, data from the sensor is transmitted through some type of communication network to a data processing unit or display device. Typically, the data processing unit is a computer that decodes and stores the data using specialized software. The information received by the data processing unit provides for the monitoring of each specific storage tank individually.

One remote monitoring system known in the prior art makes use of RF broadcasting to communicate data from the sensor to the data processing unit. Such systems are relatively inexpensive, however, they have very limited range. The data processing unit would typically be mounted in a delivery truck which would have to be in the vicinity of the customer's tank for the level to be reported.

Another prior art system uses a modem and ordinary telephone lines to communicate data from the sensor to the data processing unit. Typically, such a system will use the modem to call in and signal the data processing unit when the propane in a tank reaches a pre-determined level. The customer's phone line must be free for the system to work.

Other prior art systems used to monitor liquid volume in tanks make use of satellite or cellular communications. However, each of these systems also suffers from disadvantages in certain circumstances. For example, many satellite systems require an externally mounted satellite dish with the proper exposure. Additionally, two-way communication requires expensive equipment and installation. Cellular systems are not practical in certain locations due to a lack of cellular coverage.

No matter which communication scheme is used, the data received from the sensor is often confusing and can require significant time to decode and format into a useful form. Even then, it is still difficult for a dealer to interpret the data or use the information to optimally organize his trucks and routes. Further, a dealer must be able to access the data processing unit in order to make use of the data, and this typically requires that the dealer be physically in his office in order to monitor his business. Also, certain tank conditions, such as an over-fill or gas leak, require immediate attention. It is sometime difficult to identify certain dangerous conditions. For example, data showing rapidly falling fuel levels could indicate a leak or could simply result from a period of high fuel usage. For events occurring outside ordinary business hours, either the dealer must have an employee monitoring the system 24 hours a day or else these events will not be corrected until the next business day.

Propane dealers also face economic challenges arising from the seasonal nature of propane demand. As discussed above, demand for propane is high during the winter months, but much lower during summer. The propane dealer has a significant investment in tanks, trucks, employees, and infrastructure, and yet he receives a poor return on this investment during periods of low demand.

What is needed is an improved system for monitoring the levels of propane or other consumable liquid in remotely located storage tanks and to better coordinate delivery of liquid to those tanks.

SUMMARY OF THE INVENTION

An object of the invention, therefore, is to provide an improved apparatus and method for monitoring the levels of propane or other consumable liquid in remotely located storage tanks and to better coordinate delivery of liquid to those tanks. This goal is achieved through a novel combination of remote monitoring of customer tanks and an improved method of using the remote monitoring data to identify out-of-ordinary conditions at remote tanks, optimally schedule purchases or deliveries, improve safety, and more efficiently operate a propane dealership.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a typical delivery schedule screen according to the present invention.

FIG. 7 is a typical delivery truck routing screen according to the present invention.

DETAILED DESCRIPTION OF PREFERRED EMBODIMENTS

A preferred embodiment of this invention provides a novel system and method for monitoring the levels of propane or other consumable liquid in remotely located storage tanks and an improved system to coordinating the delivery of a liquid to remotely located storage tanks.

Although much of the following description is directed toward propane storage and delivery, the present invention could be utilized with any type of consumable liquid commonly stored in liquid storage tanks, including natural gas or anhydrous ammonia. Hence, the scope of the present invention should not be limited to propane storage and delivery. Further, although much of this discussion is directed an economic model including a propane dealer servicing propane tanks located at customer sites, the system and methods discussed herein would be equally applicable to different economic models, including for example, a large corporation or other business entity servicing a large number of remote storage tanks from one or more central storage facilities.

In accordance with another aspect of a preferred embodiment of the present invention, an agnostic communication scheme can be used for remote monitoring of liquid gas levels in storage tanks. Thus, communication does not have to be limited to a single communication platform. Any known suitable communication scheme can be employed to transmit data, such as cellular, land phone lines, wireless, satellite, cable, etc. Different communication schemes can be employed for different customers or tank locations, depending on which scheme is optimal for the individual client or location. Selection of an optimal communication network can be based upon factors such as location, availability of cellular signal, availability of telephone lines, and desired equipment investment by customer.

Figure 1:
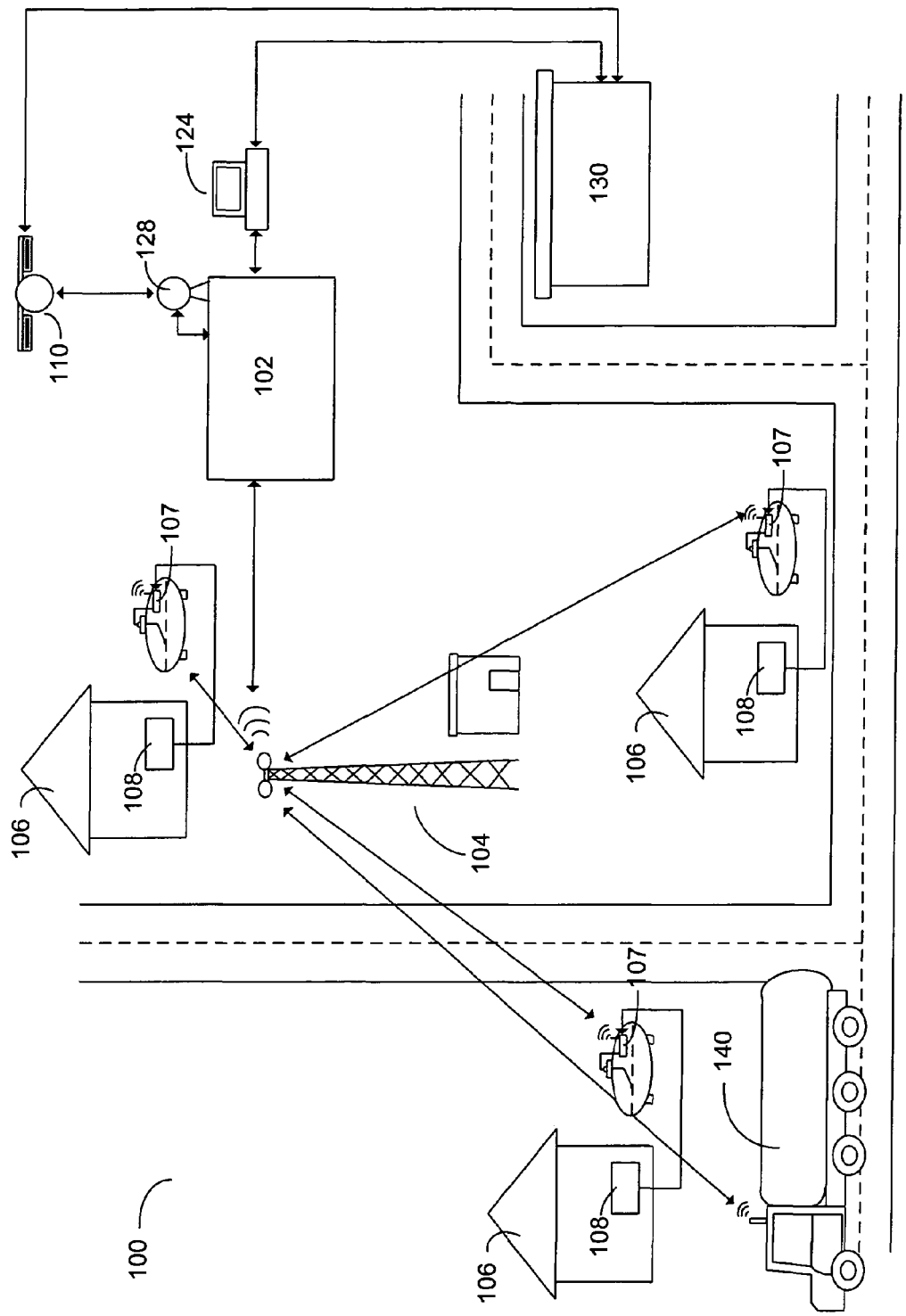
FIG. 1 shows a preferred embodiment of a remote propane monitoring system according to the present invention where a cellular communication scheme is employed.

FIG. 1 shows one aspect of a preferred embodiment of a remote propane monitoring system 100 according to the present invention where a cellular communication scheme is employed to transfer data between a storage tank monitoring unit and the central server. Remote propane monitoring system 100 comprises central processing station 102 which communicates with a plurality of monitoring units 107 located at customer sites 106 by way of one or more cellular towers 104. Communication between central server 102 and monitoring units 107 is preferably two-way communication. As discussed in greater detail below, monitoring units collect data from the propane tank sensor and optionally from one or more home monitoring sensors 108 and transfer fluid level data to the central server 102. Data can then be organized and processed (as also discussed below) and transferred from central server 102 through satellite up-link 128 to satellite 110 and/or through web server 124 to the Internet or a suitable intranet. Central server 102 can comprise one or more computers at one or more locations. End-user 130 can then access data through a wireless satellite link or through the Internet, for example by using a personal computer with Internet access. Central server 102 can also communicate with delivery trucks 140 by way of cellular towers 104.

Figure 2:
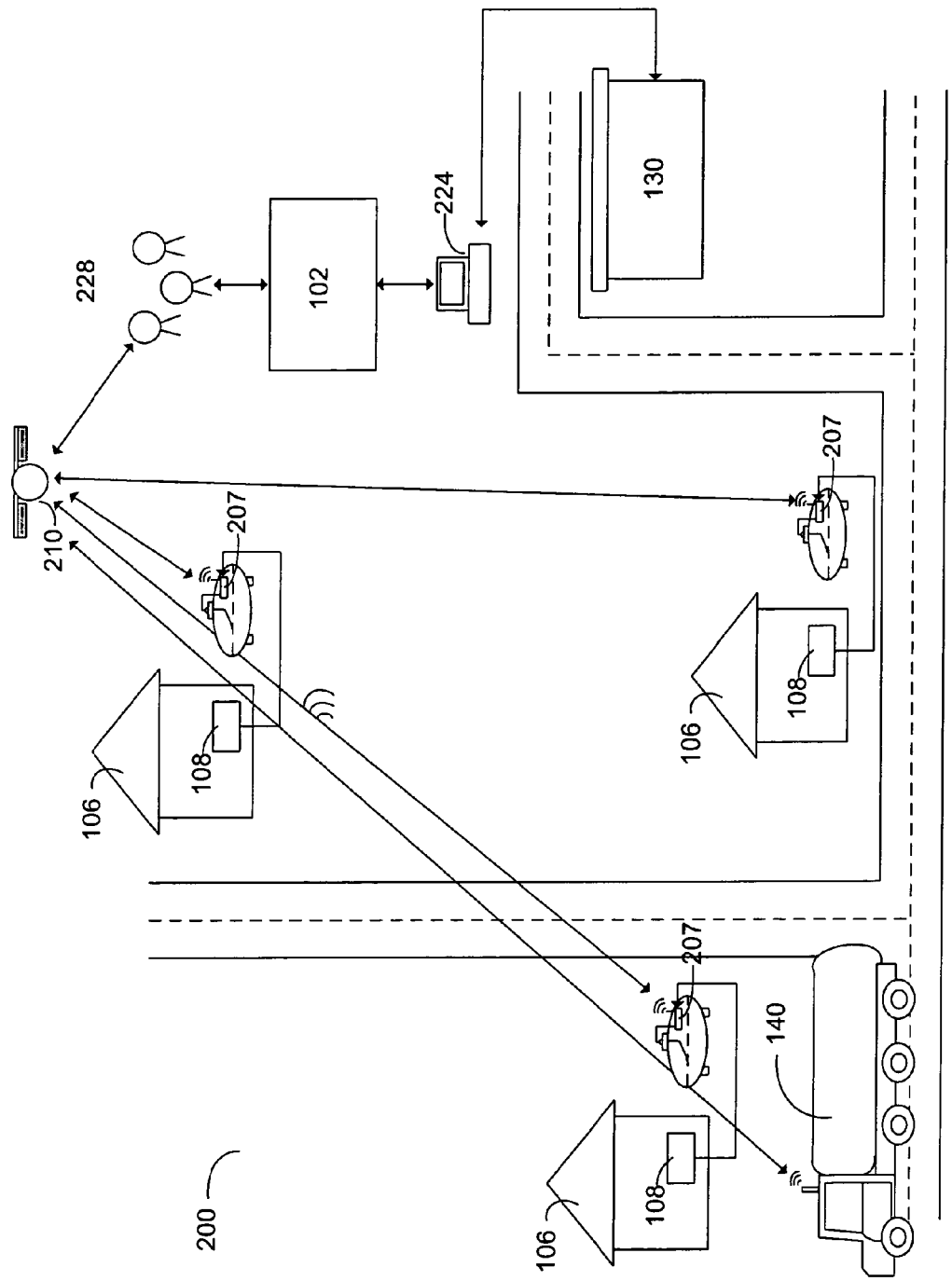
FIG. 2 shows a preferred embodiment of a remote propane monitoring system according to the present invention where a satellite communication scheme is employed.

FIG. 2 shows another preferred embodiment of a remote propane monitoring system 200 according to the present invention where a satellite communication scheme is employed to transfer data between a storage tank monitoring unit and the central server. Remote propane monitoring system 200 comprises central server 102, which communicates with a plurality of monitoring units 207 located at customer sites 106 by way of satellite 210. Monitoring units 207 can communicate with satellite 210 by way of a satellite modem and antenna (not shown). In the embodiment shown in FIG. 2 communication is one-way from the monitoring units 207 to the satellite 210. Even more preferably, however, communication between monitoring units 207 and satellite 210 can be two-way communication. As discussed in greater detail below, monitoring units collect data from the propane tank sensor and optionally from one or more home monitoring sensors 108 and transfer fluid level data to the satellite 210. Data is then transferred to central server 102 by way of satellite up-link 228. Data can then be organized and processed (as also discussed below) and transferred from central server 102 through web server 224 to the Internet or a suitable intranet. End-user 130 can then access data through the Internet or suitable intranet, for example by using a personal computer with Internet access. Optionally, monitoring units on delivery trucks 140 can also communicate with the central server 102 by way of the satellite 210 and satellite up-link 228.

Figure 3:
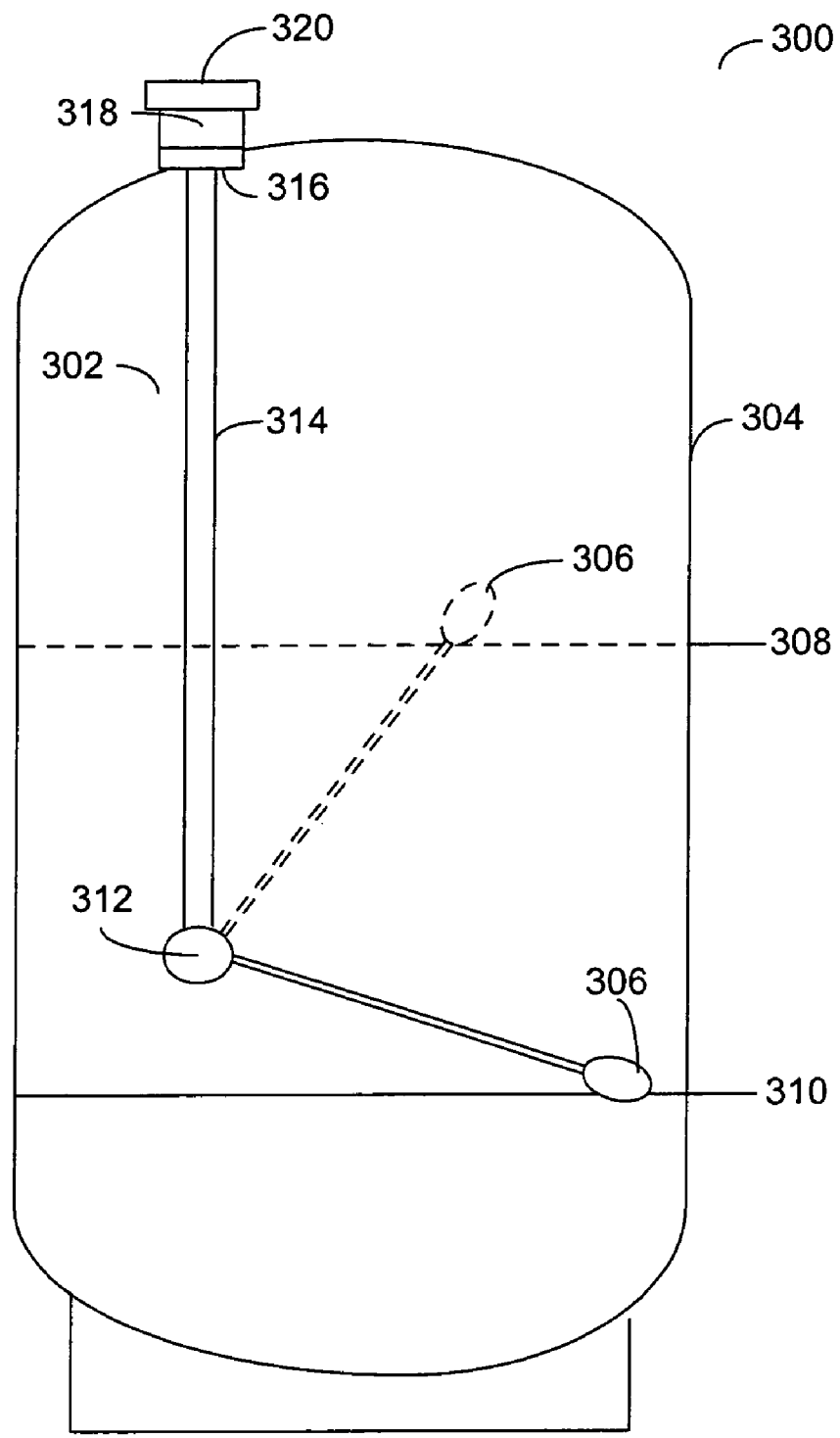
FIG. 3 shows a typical prior art liquid storage tank and float gauge.

Tank levels can be monitored by a number of different mechanisms known in the prior art. For example, one common type of gauge is known as a float gauge. As the name suggests, a float gauge has a float that rests on the surface of the fluid being measured. The position of the float will rise or fall as the level of liquid in the tank is changed. Movement of the float is sensed by a gauge, typically through the use of a magnetic coupling, to provide an indication, either visual or otherwise, of the fluid level. A typical float gauge and propane tank combination 300 is shown in FIG. 3. Float assembly 302 is mounted inside tank 304. As illustrated in FIG. 3, the position of float 306 will vary with the liquid levels 308 and 310 in the tank. The float assembly 302 represents the attachment mechanism through which the sensor unit of the present invention detects the level of the propane inside the tanks. Vertical movement of the float as it follows the level of the liquid is converted into rotational movement by a pinion 312 which rotates a shaft extending inside tube 314 and turns a master magnet 316. The float assembly 302 attaches by the float head 318 under a pressure seal. A dial gauge 320 is mounted onto the float head 318.

The dial gauge 320 will preferably comprise a dial chamber with a remote sender that gives a visual indication of tank levels while also sending an electrical signal to a monitoring unit. This electrical signal serves to give a remote indication of the tank levels.

Figure 4:
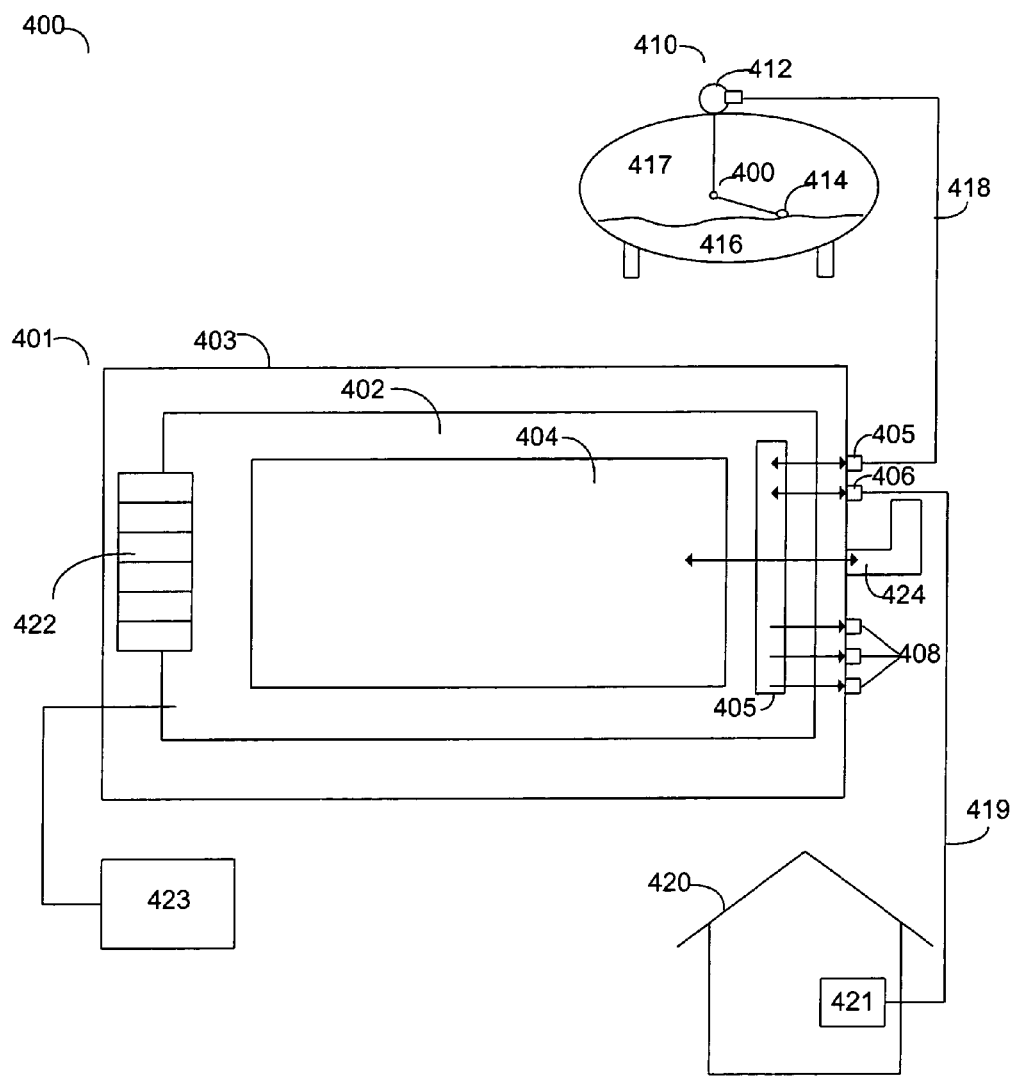
FIG. 4 shows a preferred embodiment of a monitoring unit for use with a cellular communication scheme.
Figure 5:
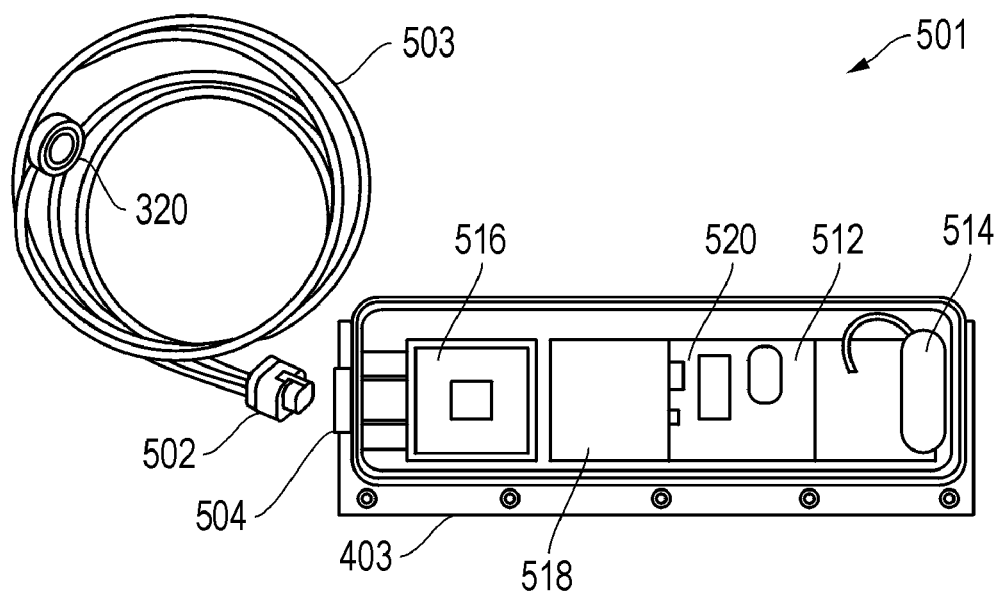
FIG. 5 shows a preferred embodiment of a monitoring unit for use with a satellite modem.

FIG. 4 shows a preferred embodiment of a local customer monitoring unit 400 according to the present invention. Monitoring unit 401 comprises a sealed case 403 containing processor 402 and at least one associated communication device 404, such as a cellular modem, line modem or satellite communication device. For example, FIG. 5 shows a preferred embodiment where the communication device is a satellite modem 518 with a flat array antenna 516. Communication device 404 can be connected to external antenna 424. Processor 402 and associated communication device 404 are preferably powered by batteries 422 or optional external power supply 423, and communicate with one or more propane tank sensors 412 through I/O port 405. Status and troubleshooting information can be displayed externally via LEDs 408.

Processor 402 comprises circuitry for implementing the following functions: receiving data from the one or more propane tank sensors 412; processing the data, and converting it into readable form if necessary; at preselected intervals or times, connecting to the central server (not shown) through the associated communication device 404 and external antenna 424 to transfer collected data; and determining whether predefined conditions have occurred, such as a low liquid level or an overfill, or whether predefined abnormal or "out of ordinary" events have occurred, such as liquid levels dropping too fast (possibly indicating a leak) or not dropping at all (indicating a possible problem with the tank sensor). As discussed in greater detail below, processor 402 can also include circuitry for receiving and storing data from one or more temperature sensors and use that data to calculate site-specific Degree-day values for each tank location. Skilled persons will recognize that said circuitry can be implemented with conventional processors and/or controllers, integrated circuits, discrete devices, or any combination of the same.

Processor 402 can communicate with tank level sensor 412 by way of a direct wire connection 418, I/O port 406, and communication bus 405. Processor 402 can communicate with a plurality of additional secondary sensors. For example, data can be collected from one or more home monitoring sensors 421 capable of detecting Carbon Monoxide, propane gas, or variations in temperature inside the customer's home. Data from these types of additional sensors can be transmitted to the central server along with data on propane tank levels. Communication between monitoring unit 401 and home monitoring sensors 421 can be through any appropriate means, including wireless RF, X-10, direct wiring. Referring also to FIG. 5 and FIG. 10B, in a preferred embodiment, a RF antenna 512 and antenna can be built into the circuitry of processor 402. Alternatively, a second I/O port allows for X-10 functionality as discussed below.

Preferably case 403 will be sealed to protect the sending unit from adverse environmental conditions. In the event of mechanical failure, the entire unit can be easily replaced. In a preferred embodiment, the monitoring unit of FIG. 4 will also provide I/O functionality (including data ports allowing the monitoring unit to communicate with X-10 devices or the customer's personal computer). Although any appropriate communication device can be used with the present invention, in a preferred embodiment the unit will have a primary communication device, such as a cellular modem, and a backup device, such as a land line modem.

Monitoring unit 401 can be operated by any appropriate power source, including direct wiring, battery packs, or solar chargers. Depending on the power source, the communication device can be configured to operate in different modes. Preferably, for example, a monitoring unit that is powered by a battery pack would be configured so that the communication device, such as a satellite modem, is powered off most of the time in order to conserve power. Processor 402 would periodically wake up the communication device to transmit data or receive incoming commands.

In a preferred embodiment, monitoring unit 401 could collect data and report to the central server once per day at a particular time, for example at 3:00 a.m. In the case of cellular transmission, this would typically allow a dealer to negotiate a cheaper cellular rate plan since most transmissions will not occur during peak cellular times. If landline communication is used, reporting at 3:00 a.m. should limit the potential interference with the customer's use of the telephone line. Additionally, as discussed above, monitoring unit could be configured to report immediately if certain types of conditions occur, including for example, overfilled tanks, greater than expected usage (which could indicate a leak), low battery, or any other "out of ordinary" condition.

FIG. 5 shows another preferred embodiment of a local customer monitoring unit according to the present invention. Monitoring unit 501 comprises a sealed case 403 containing processor 520 and battery power supply 514. Satellite modem 518 and flat array antenna 516 are used to communicate with one or more remote servers (not shown). Suitable satellite communication equipment is available, for example, from AeroAstro, Inc. of Ashburn, Va. RF antenna 512 and transceiver (not shown) are used to communicate via wireless RF transmission with one or more home monitoring and automation units such as, for example, Carbon Monoxide or propane detectors located inside a customer's home. Data from these RF-enabled units can be stored and processed by monitoring unit 501. For example, data from interior monitors can be used to determine whether an automatic tank cut-off should be activated, as discussed in greater detail below. Data from the RF-enabled units can also be transmitted to a remote central server via satellite modem 518.

In accordance with another aspect of a preferred embodiment of the present invention, data can be queued until it is reported. This would allow the collection of very detailed data, for example hourly tank levels, while minimizing connect time. This would also allow the communication system to be more tolerant of communication faults since data would be stored until a satisfactory communication is established. As discussed in greater detail below, the data collected and transmitted by the monitoring unit can include not only tank level data, but also data from home monitoring sensors (i.e., CO detector(s), propane detector(s), appliances, smoke detector(s), security sensors, etc.) and data from an on-site Degree-day recorder and history log.

In accordance with another aspect of a preferred embodiment of the present invention, data received from the tank sensors can be collected and organized so that it is easily understood and utilized by the propane dealer through the implementation of a user interface which allows the propane dealer to see each customer's current status in a graphical and contextual way. This improves the ability of the propane dealer to analyze and react to data quickly and easily without the necessity of reviewing voluminous data which is not organized in an optimum order.

For example, in a preferred embodiment, basic information and history would be accessible for each customer or each storage tank. A color-coded tank inventory can be graphically displayed so that a dealer can see a list of customers and tank levels and at a glance tell the status of each customer's tank. FIG. 6 is a typical delivery schedule according to the present invention. This screen shows the delivery vehicles selected for use and the customers scheduled for delivery. In a preferred embodiment, a program running on the central server makes the selection according to user-defined criteria. An authorized user can override the program's selections from this screen. A customer tank inventory is graphically displayed so that fluid levels can be easily seen. Tanks with sufficient propane levels can be indicated with a selected screen color, for example with icons or graphical shapes of a particular color. Tanks, which need refilling, can be shown through the use of a different screen color. Over-filled tanks can be shown through the use of a third screen color.

FIG. 7 is a typical delivery truck routing screen according to the present invention. Each stop on the scheduled delivery route is shown in order with the physical address, tank capacity, and scheduled delivery amount. Estimated time of delivery and distance between stops can also be shown.

Figure 8:
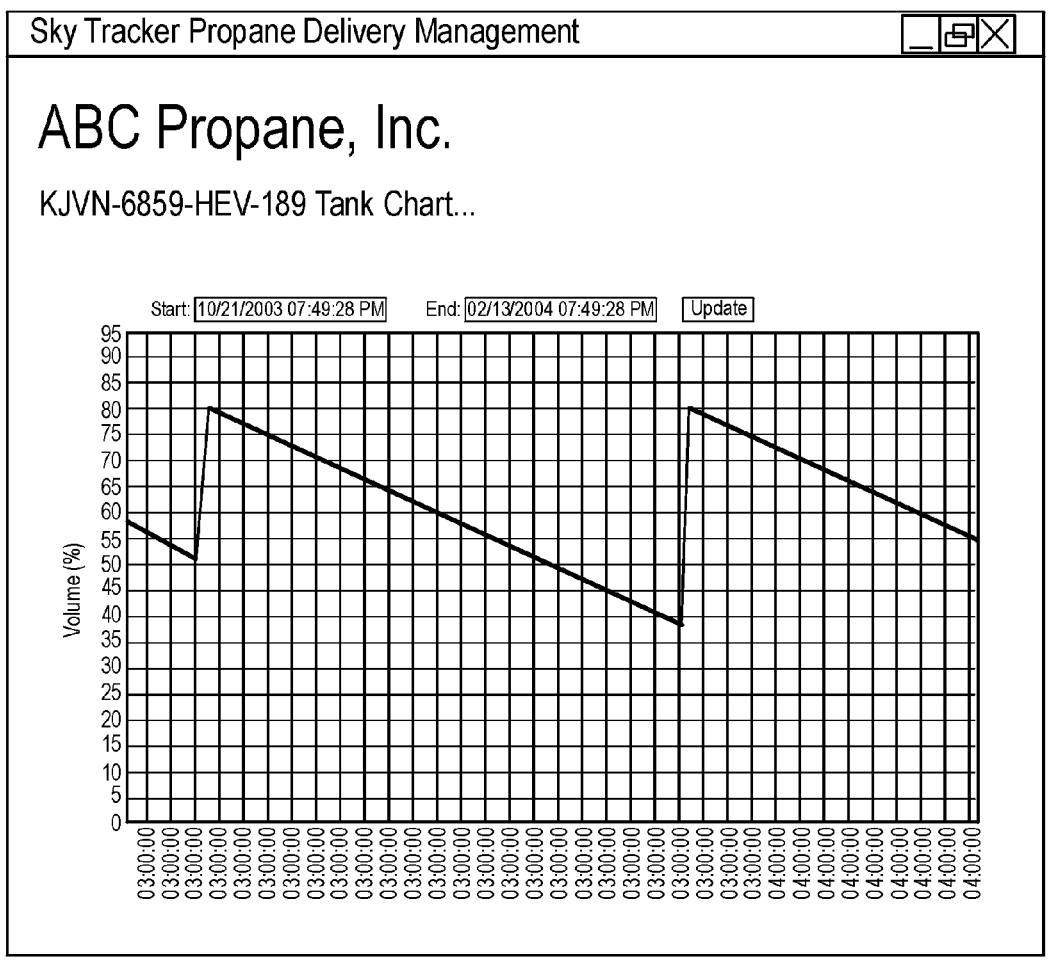
FIG. 8 is a daily posted customer tank inventory chart according to the present invention.

A daily posted customer tank inventory chart, as illustrated in FIG. 8, will preferably allow the dealer to recognize customer use trends and detect any anomalies, such as an unauthorized tank fill or pump-out. This chart graphically displays the fluid level in a customer's tank over a defined time period, for example over a four-month period. This allows the dealer to immediately identify the refill dates and to see if there is any drastic change in usage rates.

Figure 9A:
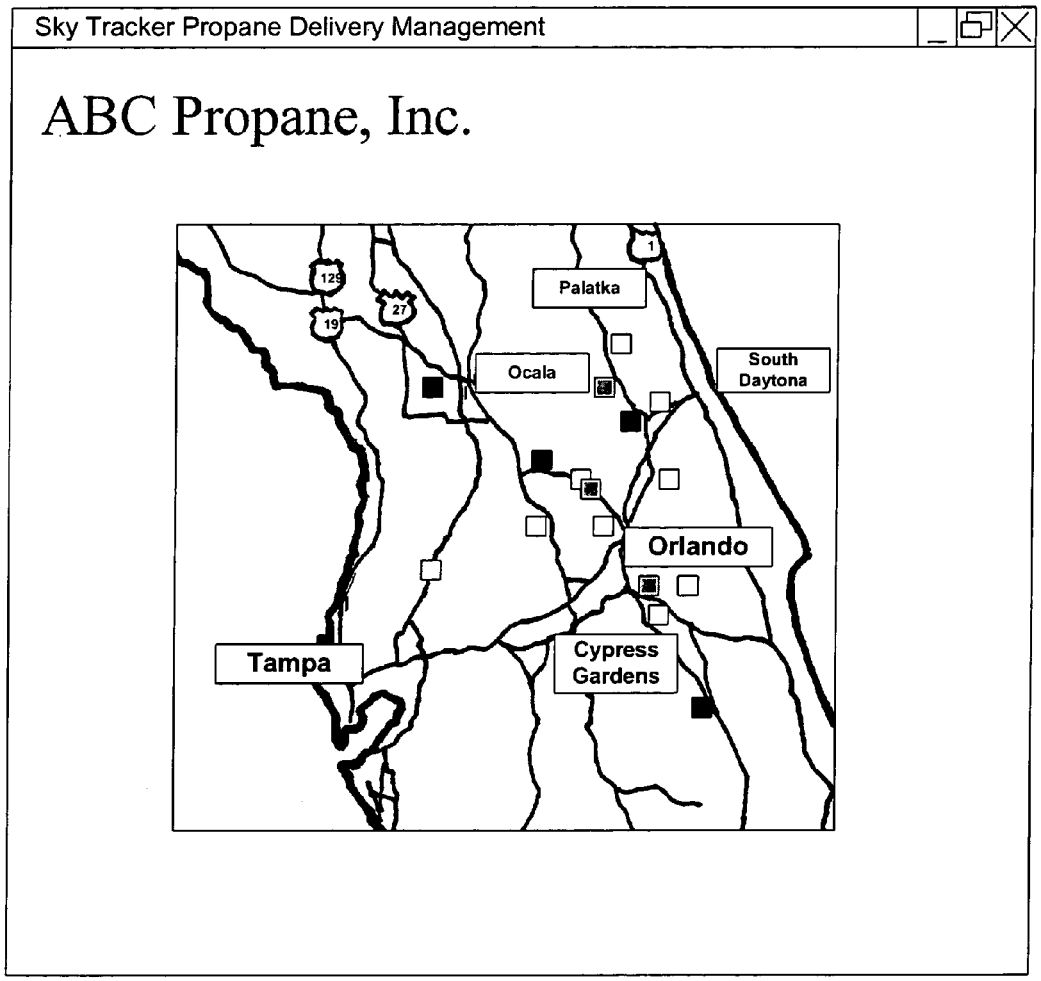
FIG. 9A is a geographic satellite view of a dealer's customer tanks and their current levels.
Figure 9B:
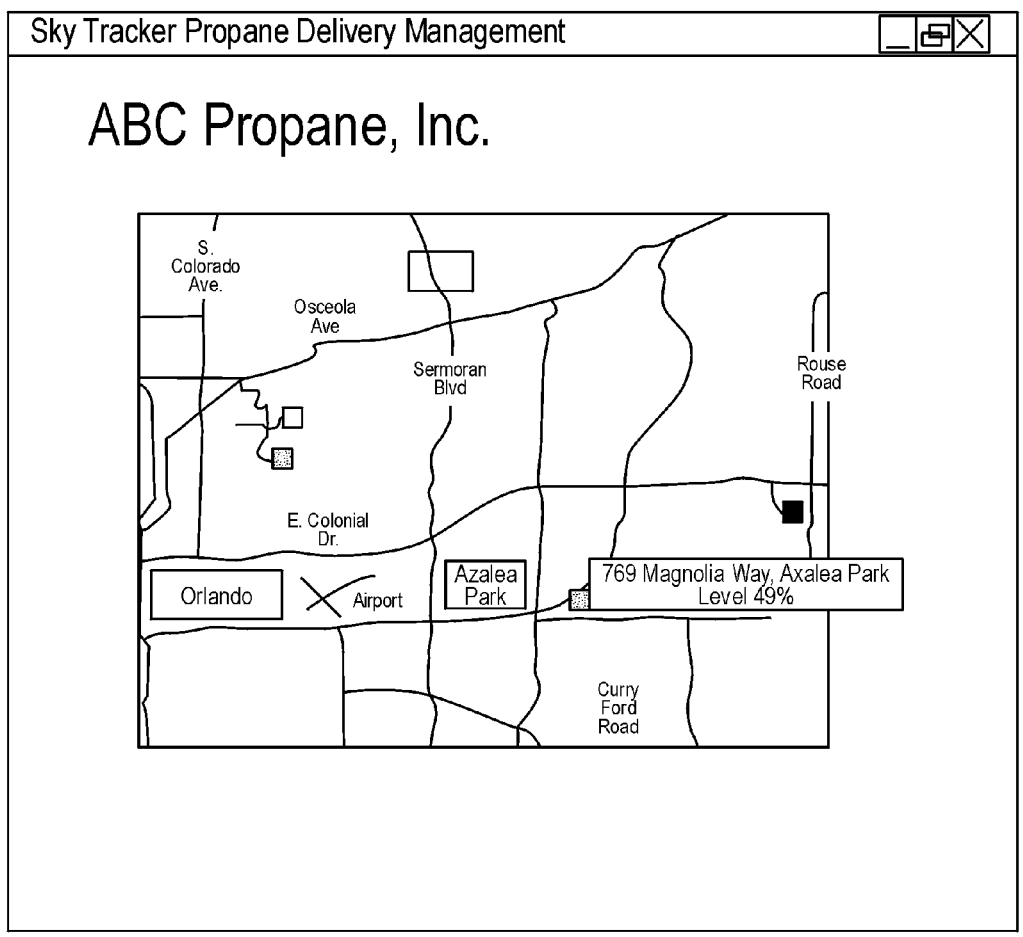
FIG. 9B is the geographic satellite view of claim 9A zoomed in to show an individual customer.

In accordance with another aspect of a preferred embodiment of the present invention, color-coded data can also be displayed on a map that shows the location and status of each tank. This would also provide for easy printing of routes and customer locations for drivers. Data received from customer tanks would automatically be used to create color-coded liquid level tank information lists accessible by the propane dealer. Custom color-coded maps showing customer locations on each delivery route can be accessed via the Internet and displayed to a PC screen and printed by delivery personnel. This allows a dealer to have a geographic or "satellite" view of all of his customer tanks and current levels and to map delivery routes that most efficiently utilize the dealer's assets and ensure that customer needs are met. Preferably, maps will be able to show an entire customer base, as shown in FIG. 9A, or zoom in on a particular customer or route, as shown in FIG. 9B.

In accordance with another aspect of a preferred embodiment of the present invention, tank sensor data can be used to calculate the most efficient delivery truck routes. It is desirable to determine how much propane to load onto each truck, and what stops to deliver in a cost efficient manner. Utilizing relevant information, such as tank level data received from customers, information on delivery trucks and sizes, availability of trucks, and delivery location points, an adaptive algorithm would preferably match the needs of the customer database with the available delivery trucks and model the most efficient routes for each available truck. By increasing efficiency, dealers can make more economical use of their equipment and employees and can maximize gallons per mile and gallons per stop ratios. The modeling could also be predictive by taking historical propane usage for each tank, weather conditions, and projected fuel usage into account in determining which tanks should be refilled along a given delivery route. Historic, Degree Day, and Julian (Elapsed) Day forecasting can also be taken into account. A preferred embodiment could also include a scheduling system that would use the optimum route determination to provide fill tickets (specifying how much propane is to be loaded onto each truck) to the staff responsible for filling up each truck in the morning and to provide routing and delivery instructions for each driver.

In accordance with another aspect of a preferred embodiment of the present invention, the system can calendar required inspections of customer tanks, homes, and appliances, as required by industry standards, either after an event, such as an out of gas situation, or after a proscribed period of time as passed. The volatile nature of propane gas creates the potential for serious ramifications to occur should a leaking pipe or joint develop. Dangerous conditions may also exist where appliances or heating units with open flames are exposed to uncontrolled fuel. Pressure testing the entire propane system, inspecting the tank, piping, regulator, gauges, connectors, valves, vents, thermostats, pilots, burners and appliance controls on a regular schedule or after an out of ordinary event occurs can significantly reduce the possibility of loss of life or property damage. The system will have the capability to alert the propane dealer and drivers to the need to perform required testing either on a regular timed basis or after the occurrence of an out of ordinary event.

In accordance with another aspect of a preferred embodiment of the present invention, data (in the form of customer information, tank inventories, or delivery information) can be combined with accounts receivable information. Customer accounts receivable balances can be displayed on a PC screen organized by route, or printed out on the color-coded route sheets discussed above. This preferably allows the dealer to arrange for payment before or on delivery or to reconfigure the delivery route where satisfactory payment arrangements cannot be made with customer.

One aspect of a preferred embodiment of the present invention is directed to a Web-based (Internet and Intranet) client-server application that enables dealers to access information relating to the monitoring of their propane tanks and inventories, along with information related to additional income producing services as discussed below. Data from remote sensors, along with the graphical and contextual organization of that data as discussed above, would thus preferably be available to end-users (for example, the propane dealer) by way of the Internet, or a LAN, WAN, or the like.

The end-user could choose to dedicate a computer monitor or monitors to the continually updated display of such information. Information may be stored on either the central server, a web server, or the end-users computer so that historical patterns and trends can be identified.

Additionally, dealers are preferably able to monitor, via a Web browser interface and in real-time, any alarms or out-of-ordinary events affecting their customers or business. In a preferred embodiment, alarm notices—such as a tank overfill notice, tank low level notice, an out-of-ordinary occurrence, or a variance from historic or Degree Day data and projections—can be posted on the Dealer log-in page. The dealer can also be notified of alarms by pager, text messaging, or email.

In accordance with another aspect of a preferred embodiment of the present invention, the use of interactive web-based managed services software, accessible by a number of dealers through individual passcode protected Web-site links, allows for across-the-board system upgrades and enhancements without requiring massive hardware or CD mailings.

In accordance with another aspect of a preferred embodiment of the present invention, the system for remote tank monitoring of propane tanks can be combined with other products using similar equipment in order to provide the propane dealer with additional non-seasonal revenue streams. As discussed above, propane business is seasonal, with highest demand occurring during the winter months. Although expensive monitoring equipment, which can include satellite, cellular, and landline communication systems, is used primarily during periods of high demand, the equipment remains at the customer's location throughout the year. Similarly, a propane business will typically require a staff with a great deal of technical expertise, but that expertise is generally only put to use during high demand periods. During the off-season, these highly trained employees will typically be used for numerous non-technical tasks.

According to the present invention, a propane dealer can take advantage of the expertise of his employees and the existing monitoring equipment infrastructure to provide additional services to customers. For example, the equipment used for satellite communication of remote tank levels can also be used to provide a customer with satellite television or Internet service. The same employees who install and service satellite monitoring systems will be able to use their technical expertise to install and service satellite entertainment services.

In a preferred embodiment, wireless RF or X-10 functionality on the monitoring unit allows home monitoring and automation services and data to be transmitted with the same equipment used for tank monitoring (even where satellite equipment is not installed or is not available.) As is well known to those of ordinary skill in the art, the term X-10 refers to a standardized protocol accepted as an industry standard for communication between devices via AC power lines within a single facility. X-10 communicates between transmitters and receivers by sending and receiving signals over the AC power line wiring. These signals involve short RF bursts, which represent digital information. This X-10 functionality can be controlled by way of the customer's PC, and can easily be accessed through the Internet. As discussed above, in a preferred embodiment, the monitoring unit will have a built-in RF transceiver and antenna allowing the processor to interface with home monitoring sensors or home automation devices, such as X-10 devices. Other types of communication protocols and connections could also be used to connect home monitoring sensors to the monitoring unit, including hard-wired connections. This allows the propane dealer to also offer, for a relatively small equipment and training investment, home security and fire monitoring, home automation, and specialized monitoring which is desirable for propane customers, such as Carbon Monoxide and propane gas monitoring inside the home.

By combining wireless entertainment and RF or X-10 functionality with the tank monitoring system discussed herein, both monitoring and additional revenue-producing services preferably benefit from cost savings and increased efficiencies.

In accordance with another aspect of a preferred embodiment of the present invention, where more than one type of tank monitoring communication scheme could be used, the communication scheme can be matched to additional services desired by the customer, thus creating additional efficiencies and cost savings. For example, where the customer wishes to purchase satellite television or Internet services, the same satellite equipment could be used to provide the communication between the monitoring sensors and the data server.

In accordance with another aspect of a preferred embodiment of the present invention, delivery vehicles and storage tanks could be equipped with GPS transmitters or transmitter-receivers in order to track delivery fleet movements and to monitor the location of tanks. In conjunction with the routing system discussed above, routes for various trucks could be changed in mid-route and the new routes delivered to the vehicles GPS system. Additionally, the GPS system could be combined with an automatic vehicle shut-off system which could be automatically or manually triggered, for example if the vehicle gets too far off of its assigned route (indicating that the vehicle has been stolen).

In accordance with another aspect of a preferred embodiment of the present invention, a tank monitoring system could be equipped with an internal Degree-day monitor for each tank location. Sensors could preferably be used to continuously or periodically monitor temperature readings or other weather conditions at each tank site in order to calculate elapsed Degree-days for each tank location. Site-specific Degree-day calculations could be used to more accurately predict tank levels and to more accurately determine whether an out-of-ordinary event has occurred. These site-specific calculations could either be performed by the tank monitoring system processor or the data could be transmitted to a central server for processing. Daily and accumulated Degree-days (annual) can be stored either by the tank monitoring unit or by the central server. As discussed above, Degree-days have historically been used to estimate propane (or other fuel) usage. However, the Degree-day monitoring is typically done only one location, such as the propane dealer's office. In some parts of the country, daily temperature variations across a dealer's delivery area can be extreme. Monitoring temperature at each tank location and using that data to calculate site-specific Degree-days would be a significant improvement over the prior art.

Site-specific Degree-day and historic fuel levels can be used to calculate the K-factor for each tank. Further, Degree-day and K-factor calculations can be updated every time a tank's fluid level is measured. This allows the calculations to better account for periods of unusual temperatures or usage levels, which in turn allows for improved detection of out-of-ordinary events such as a stuck tank float gauge, an open bleed valve, an underground line leak, or any reduction in fuel level not compatible with a customer's history and current weather patterns.

Stored and "real time" Degree-day, K-factor, and usage data for a given tank can also be used to calculate predicted tank levels, using for example, a predictive algorithm taking into account some or all of the data collected and stored by the monitoring unit. The predicted tank levels can be compared to actual tank levels to better determine whether an out-of-ordinary event has occurred. For example, a relatively minor difference between predicted and actual levels might trigger a customer contact or a service call to check for problems. A major difference between predicted and expected levels could trigger a more urgent response, such as immediate notification of the fuel dealer and customer or an automatic shut-off of fuel flow as discussed below. Data from secondary sensors, such as temperature sensors located in a customer's house, along with Degree-day, K-factor, and usage data for nearby or similarly situated tanks can also be used to calculate predicted fuel levels or to more accurately detect out-of-ordinary events. Again, these site-specific calculations could either be performed by the tank monitoring system processor or the data could be transmitted to a central server for processing.

In accordance with another aspect of a preferred embodiment of the present invention, the tank monitoring system could be configured to automatically shut off propane flow from the tank in the event of a leak. A significant propane leak in or near a customer's home can have catastrophic consequences. Automatic leak detection can be difficult, however. Propane gas detectors have sensors and batteries that wear out and they need to be located near the leak to be effective. Also, many propane customers do not used gas detectors because of the expense or difficulty in installation. Rapidly dropping fuel levels could indicate a leak, but could also be the result of sudden high propane usage (sometimes seen, for example, when the weather turns suddenly colder or when pool heaters or commercial grain dryers are operated). On-site Degree-day calculation makes it much easier to determine when a leak is present. In the event that tank levels are dropping faster than expected based upon on-site Degree-days or if levels are falling faster than a predefined amount, a processor-controlled valve could be used to cut off propane flow out of the tank. Propane flow could also be shut off if any secondary monitoring sensor, for example one located inside the customer's home, detects the presence of a significant amount of propane gas in the air. Preferably, the shut-off valve could also be activated if the processor receives a command from the central server, such as a shut-off command from the dealer.

In accordance with another aspect of a preferred embodiment of the present invention, site-specific Degree-day data could be used to more accurately estimate available storage space in customer's tanks, which in turn can be used by the dealer to more accurately predict when the dealer will need to replenish his inventory. It can take several days for propane to travel through pipelines to reach a dealer. Propane prices also fluctuate significantly throughout the year so that it is advantageous for the dealer to buy as much propane as possible during periods where the price is low. The more accurately propane usage and available storage capacity can be estimated, the more efficiently the dealer can determine when to purchase additional fuel and how much fuel should be purchased. Accurate information concerning customer tank levels and predicted usage allows the dealer to better make use of customer storage capacity allowing the dealer to purchase more propane when price levels are low. In a preferred embodiment, data concerning predicted weather conditions can also be combined with the data discussed above to predict fuel levels several days into the future.

In accordance with another aspect of a preferred embodiment of the present invention, Degree-day data and tank level data can be used to estimate actual fuel levels in tanks that have dropped below 5%. The fluid level gauge on a typical propane tank only goes down to 5%. However, even when the fluid level drops to zero, there is still a volume of propane gas present in the tank and lines that can often provide several days of fuel for the customer. Also, it is important to refill a tank before it has been emptied of all propane gas because an empty tank can pose a significant safety hazard. Before refilling, an empty tank may have to be purged of all air to get moisture out of the tank. Further, the tank should be pressure tested to make sure there are no leaks. Additionally, all pilot lights fueled by the tank will have to be re-lit. Typically, a propane delivery driver will not be able to refill an empty tank alone because of the time and additional expertise required. Instead, an employee with more specialized training and equipment will have to accompany the driver (increasing costs for the dealer). By using Degree-day data and historic tank level data to extrapolate fuel or vapor levels for nearly empty tanks, a dealer can better estimate when a tank will be completely empty. This will allow him to wait as long as possible before refilling, but also to make sure that the tank is not completely emptied.

In accordance with another aspect of a preferred embodiment of the present invention, a pressure gauge can be mounted onto a tank so that actual pressure data can be monitored by the tank monitoring unit in the same way that fluid levels are monitored as discussed above.

In accordance with another aspect of a preferred embodiment of the present invention, the tank monitoring unit is housed within a protective case designed so that electrical connection to the monitoring unit takes place within an atmospherically sealed chamber. A typical electrical connection or metal-to-metal contact creates a risk of a spark—a potentially hazardous event in the presence of any significant amount of propane gas.

Figure 10A:
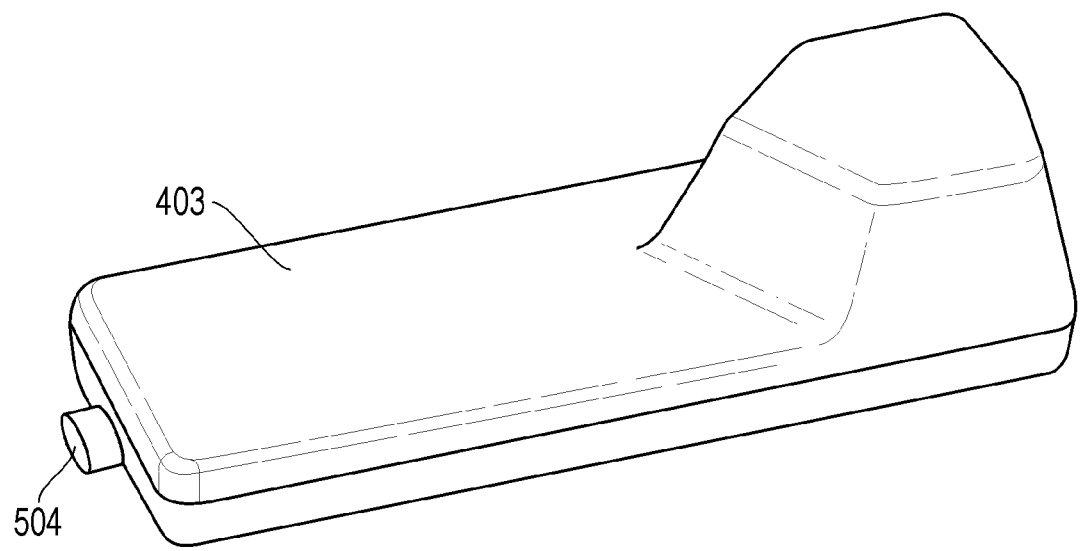
FIG. 10A shows the exterior of an explosion-proof case according to the present invention.
Figure 10B:
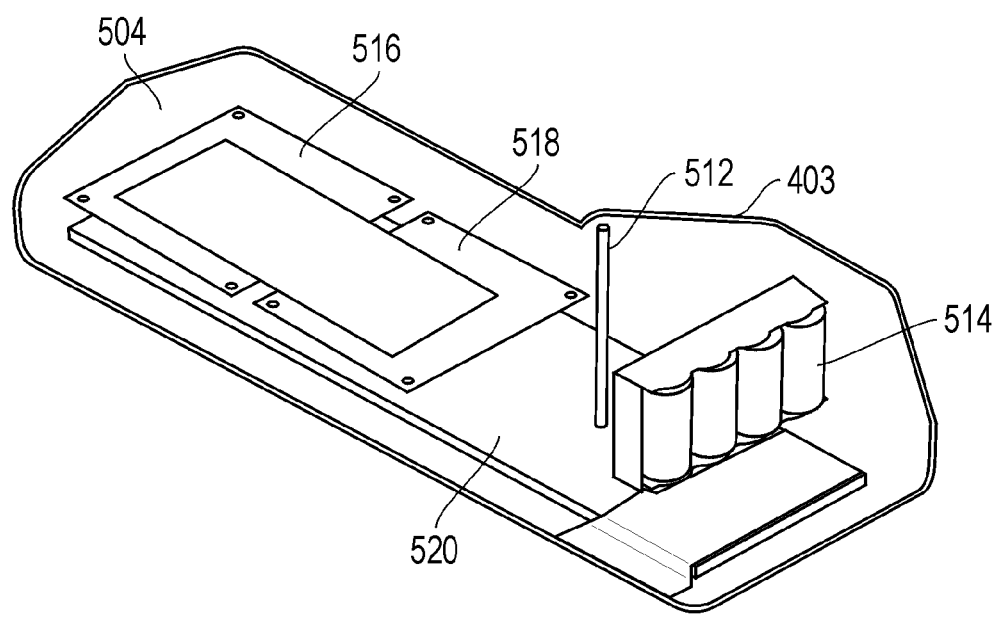
FIG. 10B shows the interior of explosion-proof case according to the present invention.

FIG. 10A and FIG. 10B show a protective case 403 in accordance with the present invention. Case 403 is preferably sealed with an airtight seal to protect monitoring unit circuitry from adverse environmental conditions and to isolate any electrical connections within the case from the atmosphere surrounding the case to prevent explosion in the event of a propane leak. Referring also to FIG. 5, wire connection 418 is used to carry signals from dial gauge 320 to monitoring unit 501. Wire connection 418 is preferably connected to monitoring unit 501 by way of an explosion-proof electrical connection. When male connector 502 is connected to female PCB-mount connector 504 a diaphragm or gasket (not shown) is used to create an airtight seal between the male and female connectors before any electrical connection is made so that any spark produced in completing the connection is isolated from the atmosphere surrounding case 403. Skilled persons will recognize that an air-tight seal around the wire connection could be accomplished in a number of ways well-known in the prior art, including a flexible diaphragm, a gasket, a mechanical valve, or any combination thereof.

Because the electrical connections and circuitry within case 403 are isolated from the atmosphere, the case can be mounted directly onto a tank containing propane or other flammable fuel. Prior art systems typically make use of a unit mounted inside the customers home that communicates via wired or wireless communication with only a sending unit at the tank. By using a self-contained tank monitoring unit that both receives the data from the tank, and transmits data to the central server, the system is much easier to install, allowing drivers rather than service personnel to handle installation or replacement of defective units. Also, allowing the entire unit to be safely mounted on the tank itself provides significant advantages. Access to the customer's home is not required so that the customer need not be home when the monitoring system is installed. Further, locating the monitoring unit outside on the tank makes it easier for the dealer to retrieve the equipment in the event that a customer does not pay his bills. In the event of mechanical failure, the entire unit can be easily replaced, again without requiring access to the customer's home. Preferably the box is mounted on the tank using a connection method that does not involve metal-to-metal contact such as highly adhesive tape affixed to the underside of the unit.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A computer implemented method for monitoring fluid levels of a consumable liquid in a storage tank, the method comprising:

providing at least one monitoring unit associated with a storage tank, said monitoring unit in close proximity to the storage tank and communicatively linked with a sensor that provides fluid level information indicative of the amount of fluid in the storage tank, wherein the monitoring unit includes at least one processor with circuitry for receiving and processing the fluid level information;

wherein at least one monitoring unit is capable of calculating predicted fluid levels based upon communicated tank sensor information and comparing actual fluid levels to predicted fluid levels to determine whether a predefined out-of-ordinary event has occurred.

2. The method of claim 1 wherein the at least one monitoring unit is also communicatively linked with a temperature sensor that provides temperature information indicative of the ambient temperature at the storage tank location, and wherein said monitoring unit processor also receives and processes the communicated temperature information and said memory stores processed temperature information.

3. The method of claim 2 wherein processing the communicated tank sensor information and temperature information comprises:

using stored fluid level information to determine historical fuel usage for each tank;

using said temperature information to calculate the number of elapsed Degree-Days for each tank location;

using historical fuel usage and Degree-Day values to calculate a predicted fluid level for each storage tank; and comparing the predicted fluid level to the actual fluid level determined from fluid level information received from said fluid sensor to determine whether a predefined out-of-ordinary event has occurred.

4. The method of claim 1 further comprising a valve capable of shutting off the flow of fuel out of the storage tank, said valve operably connected to said monitoring unit so that the valve can be closed when a predefined out-of-ordinary event has occurred.

5. The method of claim 2 further comprising at least one central server remotely located from the storage tank and communicatively linked with said monitoring unit so that processed fluid level and temperature information is communicated from said monitoring unit to the central server.

6. The method of claim 5 wherein said information is communicated from said monitoring unit to the central server by a satellite communication system.

7. The method of claim 6 further comprising:
one or more secondary sensors for detecting the occurrence of a local phenomena and transmitting a detection signal to the monitoring unit;
said monitoring unit being capable of receiving a detection signal from secondary sensors, processing the signal, and sending data concerning the detection signal through a communications link to the central server.

8. The method of claim 7 wherein said detection signal is transmitted from the one or more secondary sensors to the monitoring unit by a wireless RF signal.

9. The method of claim 5 further comprising a satellite communication system for communicating said information from the monitoring unit to the central server and a wireless RF transceiver.

10. The method of claim 5 wherein said central server comprises one or more computers at one or more physical locations executing software.

11. The method of claim 1 further comprising a graphical user interface configured to download information to be displayed and to allow user input.

12. The method of claim 11 wherein the graphical user interface is an Internet web browser.

13. The method of claim 11 wherein information concerning fluid level data is organized and displayed graphically.

14. The method of claim 13 wherein displaying information graphically comprises displaying a tank inventory listing customers and corresponding fluid levels with levels above or below predetermined thresholds color-coded so that particular fluid ranges can be easily identified.

15. The method of claim 13 wherein displaying information graphically comprises displaying alarm messages whenever a remote monitoring unit has notified the central server that a predefined out-of-ordinary event has occurred.

16. The method of claim 15 further comprising sending alarm messages via pager, text messages, or email whenever a remote monitoring unit has notified the central server that a predefined out-of-ordinary event has occurred.

17. The method of claim 1 wherein the tank sensor comprises a pressure gauge.

18. The method of claim 1 wherein said monitoring unit is housed within a non-metal housing which isolates the monitoring unit from the atmosphere surrounding the housing and wherein said monitoring unit is communicatively linked with at least one tank sensor by way of an explosion-proof electrical connection.

19. The method of claim 18 wherein the monitoring unit housing is mounted onto the storage tank.

20. A computer implemented method for monitoring fluid levels of a consumable liquid in a storage tank, the method comprising:
providing at least one monitoring unit associated with a storage tank, said monitoring unit in close proximity to the storage tank and communicatively linked with a sensor that provides fluid level information indicative of the amount of fluid in the storage tank, wherein the monitoring unit includes at least one processor with circuitry for receiving and processing the fluid level information;
wherein at least one monitoring unit is also communicatively linked with a temperature sensor that provides temperature information indicative of the ambient temperature at the storage tank location, and wherein said monitoring unit processor also receives and processes the communicated temperature information and said memory stores processed temperature information;
wherein at least one monitoring unit is capable of calculating predicted fluid levels based upon communicated tank sensor information and comparing actual fluid levels to predicted fluid levels to determine whether a predefined out-of-ordinary event has occurred;
providing a central server remotely located from the storage tank, said central server communicatively linked with the monitoring unit so that fluid level information can be transmitted via a communications link to the central server from the monitoring unit;
receiving, by the processor, fluid level information from the sensor;
determining, by the processor, whether a predefined out-of-ordinary event has occurred;
in response to a determination that a predefined out-of-ordinary event has occurred, sending notice via the communications link to the central server from the monitoring unit;
transmitting fluid level information from the monitoring unit to the central server via the communications link between the monitoring unit and the central server; and
receiving, by the central server, fluid level information, the central server then processing received fluid level information (i) to provide displayable fluid level data, and (ii) to forecast future fluid levels utilizing at least stored fluid level data.

* * * * *